(12) United States Patent
Kim et al.

(10) Patent No.: US 7,983,330 B2
(45) Date of Patent: Jul. 19, 2011

(54) ENCODING UPLINK ACKNOWLEDGMENTS TO DOWNLINK TRANSMISSIONS

(75) Inventors: Bong Hoe Kim, Gyeonggi-do (KR); Young Woo Yun, Seoul (KR); Ki Jun Kim, Seoul (KR); Eun Sun Kim, Seoul (KR); Joon Kui Ahn, Seoul (KR); Suk Hyon Yoon, Seoul (KR); Dong Youn Seo, Seoul (KR); Hak Seong Kim, Seoul (KR); Jung Hoon Lee, Seoul (KR); In Jae Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/972,356

(22) Filed: Dec. 17, 2010

(65) Prior Publication Data

US 2011/0085479 A1   Apr. 14, 2011

Related U.S. Application Data

(63) Continuation of application No. 11/764,069, filed on Jun. 15, 2007, now Pat. No. 7,916,775.

(60) Provisional application No. 60/805,059, filed on Jun. 16, 2006.

(30) Foreign Application Priority Data

Jun. 16, 2006   (KR) .......................... 10-2006-0054563
Jun. 16, 2006   (KR) .......................... 10-2006-0054564
Aug. 8, 2006   (KR) .......................... 10-2006-0074636

(51) Int. Cl.
H04L 5/16   (2006.01)

(52) U.S. Cl. ........ 375/220; 375/141; 375/267; 375/299; 375/347; 370/278; 370/280; 370/282; 714/749; 714/750; 714/756

(58) Field of Classification Search ................. 375/141, 375/144, 148, 219, 220, 222, 260, 267, 285, 375/296, 299, 340, 342, 347, 349; 714/748–750, 714/758; 370/278, 280, 282, 294
See application file for complete search history.

(56) References Cited

U.S. PATENT DOCUMENTS 6,882,619 B1   4/2005 Gerakoulis
(Continued)

FOREIGN PATENT DOCUMENTS

EP   0973117   1/2000
(Continued)

OTHER PUBLICATIONS

NTT DoCoMo et al., "Multiplexing Method of Shared Control Channel in Uplink Single-Carrier FDMA Radio Access," TSG-RAN WG1 #42bis, R1-051143, Oct. 2005, XP-050100755.
(Continued)

Primary Examiner — Dac V Ha
(74) Attorney, Agent, or Firm — Lee, Hong, Degerman, Kang & Waimey

(57) ABSTRACT

A portable device, such as a mobile terminal or user equipment, for encoding uplink acknowledgments to downlink transmissions. The portable device includes a receiver configured to receive a plurality of data blocks, such that each of the data blocks include an associated cyclic redundancy check (CRC), and a processor configured to determine received status for each of the data blocks by checking the CRC of each of the data blocks. The portable device further includes a transmitter for transmitting a response sequence which indicates the received status of all of the data blocks.

12 Claims, 19 Drawing Sheets

U.S. PATENT DOCUMENTS

| | | |
|---|---|---|
| 7,079,489 B2 | 7/2006 | Massie et al. |
| 7,392,460 B2 * | 6/2008 | Kim et al. ............... 714/781 |
| 7,636,328 B2 * | 12/2009 | Teague et al. ............ 370/277 |
| 7,738,423 B2 * | 6/2010 | Khan ...................... 370/331 |
| 2001/0056560 A1 | 12/2001 | Khan et al. |
| 2004/0042492 A1 | 3/2004 | Suzuki et al. |
| 2004/0228320 A1 | 11/2004 | Laroia et al. |
| 2005/0052991 A1 | 3/2005 | Kadous |
| 2005/0238053 A1 | 10/2005 | Iochi et al. |
| 2006/0036922 A1 * | 2/2006 | Hong et al. ............... 714/748 |
| 2006/0107166 A1 | 5/2006 | Nanda |
| 2006/0203924 A1 | 9/2006 | Casaccia et al. |
| 2007/0097987 A1 * | 5/2007 | Rey et al. ............ 370/395.52 |

FOREIGN PATENT DOCUMENTS

| | | |
|---|---|---|
| EP | 1533966 | 5/2005 |
| EP | 1569403 | 8/2005 |

OTHER PUBLICATIONS

InterDigital, "Scheduling and Multiplexing of CQI and ACK/NACK Feedback for Single Carrier FDMA in Evolved UTRA Uplink," 3GPP TSG RAN WG1 Meeting #44bis, R1-060852, Mar. 2006, XP-050101762.

* cited by examiner

Distributed

Localized 1 : distributed within N RU

Localized 2 : pure localized

ENCODING UPLINK ACKNOWLEDGMENTS TO DOWNLINK TRANSMISSIONS

CROSS-REFERENCE TO RELATED APPLICATIONS

This application is a continuation of U.S. application Ser. No. 11/764,069 filed on Jun. 15, 2007, now U.S. Pat. No. 7,916,775, which pursuant to 35 U.S.C. §119(a), claims the benefit of earlier filing date and right of priority to Korean Application No. 10-2006-0054564, filed on Jun. 16, 2006, 10-2006-0054563, filed on Jun. 16, 2006, and 10-2006-0074636, filed Aug. 8, 2006, and pursuant to 35 U.S.C. §119 (e), this application further claims benefit of priority from provisional patent application 60/805,059, filed Jun. 16, 2006. The contents of such applications are hereby incorporated by reference herein in their entirety.

BACKGROUND OF THE INVENTION

1. Field of the Invention

The present invention relates to wireless communications, and in particular, to encoding uplink acknowledgments to downlink transmissions.

2. Discussion of the Related Art

One multiple carrier communication scheme transmits data through a number of orthogonal subcarriers. Examples of such systems, which typically require a high data rate, include wireless location area networks (LANs) and mobile Internet technologies. Typical multiple carrier communication schemes include orthogonal frequency division multiplexing (OFDM), discrete Fourier transform-spreading-orthogonal frequency division multiplexing (DFT-S-OFDM or DFT-Spreading-OFDM) (also referred to as SC-FDMA), and orthogonal frequency division multiplexing access (OFDMA). Although OFDM and OFDMA can achieve a high transfer rate by keeping subcarriers orthogonal, such techniques often have a high peak-to-average power ratio (PAPR). DFT-S-OFDMA is a technique which may be implemented to overcome the PAPR problem, for example. DFT-S-OFDMA functions by first spreading signals with a DFT matrix in the frequency domain before generating OFDM signals. The signals which were spread may then be modulated and transmitting in known fashion using conventional OFDM techniques. This technique will now be described.

FIG. 1 is a flowchart depicting the generation of a transmission signal according to a conventional DFT-S-OFDMA system. According to blocks 110 and 120, a typical DFT-S-OFDM wireless communication system spreads signals using a DFT matrix before generating the OFDM signals. Consider an equation in which "s" is an input data symbol, "x" is data spread in the frequency domain, and "$N_b$" is the number of subcarriers for a particular user. In such a scenario, the spread data "x" may be obtained using the following:

$$x = F_{N_b \times N_b} s,$$

where $F_{N_b \times N_b}$ is a $N_b \times N_b$ DFT matrix used to spread the input data symbol.

According to blocks 130, 140, and 150, the spread vector "x" is shown mapped to a subcarrier according to a subcarrier mapping technique, and is then transformed into the time domain through an inverse discrete Fourier transform (IDFT) module to obtain a signal for transmission to a receiving entity. The transmission signal "y" may be obtained using the following:

$$y = F_{N \times N}^{-1} x,$$

where $F_{N \times N}$ is an N×N DFT matrix used to transform a frequency domain signal into a time domain signal. The signal "y" generated in this manner is transmitted with an inserted cyclic prefix (block 160).

Data, pilots, and control information are then transmitted in the uplink of multiple carrier systems, including, for example, the DFT-S-OFDM system. Control information can be divided into data-associated control information, which is associated with data demodulation, and non-data-associated control information, which is not associated with data demodulation.

Data-associated control information includes control information required to reconstruct data transmitted by user equipment (UE). For example, data-associated control information may include information associated with the transmit format or information associated with hybrid automatic repeat-request (HARQ). The amount of the data-associated control information can be adjusted according to an uplink data scheduling scheme.

On the other hand, non-data-associated control information is control information required for downlink transmission. For example, the non-data-associated control information may include acknowledgment (ACK) or negative acknowledgment (NACK) information for HARQ operation, and a channel quality indicator (CQI) for link adaptation of the downlink.

In an uplink multi-carrier or single-carrier FDMA system, control information is divided into a data-associated control information for demodulating user data and non-data-associated control information for downlink transmission. A basic principle of OFDM includes dividing a data stream having a high data rate into a plurality of data streams, each of which has a slow data rate, and then transmitting the data streams simultaneously using a plurality of carriers. Each the carriers is referred to as a subcarrier. Since orthogonality exists between the carriers of OFDM, if frequency components of the carriers are overlapped with each other, a transmitting terminal can still detect the frequency components.

The data stream having the high data rate is converted to a plurality of data streams having slow data rates via a serial to parallel converter. Each of the parallel-converted data streams is multiplied by a corresponding subcarrier, added together, and then transmitted to the receiving terminal.

The parallel data streams generated by the serial to parallel converter can be transmitted as a plurality of subcarriers by IDFT. IDFT can be efficiently implemented using an inverse fast Fourier transform (IFFT).

As symbol duration of the subcarrier having the slow data rate increases, relative signal dispersion, which occurs by multi-path delay spreading, decreases on the time domain. Inter-symbol interference may be reduced by inserting a guard interval longer than the channel delay spreading between OFDM symbols. If a portion of an OFDM signal is copied to the guard interval and arranged at a start portion of the symbol, the OFDM symbol is cyclically extended to be protected.

The amount of frequency resources used for data transmission may be reduced if the UE allocates a sufficient number of subcarriers to non-data-associated control information when transmitting the control information in the uplink. This technique consequently results in a large number of subcarriers which are unable to be allocated, thus affecting the ability to achieve diversity gain in the frequency domain.

A typical UE separately transmits ACK/NACK and CQI signals among non-data-associated control information in the uplink. For example, the UE transmits the ACK/NACK signal, the CQI signal, or both of these signals at a particular time period. However, conventional multiple carrier systems do not typically distinguish between such signals when processing the non-data-associated control information. This prevents efficient utilization of frequency resources.

If ACK/NACK and CQI signals are transmitted using a single discrete Fourier transform (DFT) in the uplink of the DFT-S-OFDM communication system, a number of users will typically share the same resource unit. For instance, if one user transmits an ACK/NACK signal and another user transmits a CQI signal with the same resource unit, it may not be possible for a base station to demodulate the ACK/NACK and CQI signals of the two users.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for encoding uplink acknowledgments to downlink transmissions includes receiving a plurality of data blocks, such that each of the data blocks include an associated cyclic redundancy check (CRC). The method further includes determining received status for each of the data blocks by checking the CRC of each of the data blocks, and generating a response sequence which indicates the received status of all of the data blocks.

According to one feature, the data blocks include a primary transport block and a secondary transport block.

According to another feature, the response sequence is a discrete response sequence.

According to yet another feature, the method further includes generating the response sequence as a single response sequence which indicates the received status of all of the data blocks.

According to still yet another feature, the receiving of the data blocks is from a Node B.

According to one aspect, the status is either an acknowledgment (ACK) which identifies a data block which has been received without error, or a negative acknowledgment (NACK) which identifies a data block which has been received with an error.

According to another aspect, the method further includes modulating the response sequence using QPSK modulation.

According to yet another aspect, the method further includes transmitting the response sequence to a Node B.

According to still yet another aspect, the downlink transmissions include multiple input multiple output (MIMO) transmissions.

According to one feature, the method further includes receiving the data blocks in parallel.

According to another feature, the downlink transmissions comprise time division duplex (TDD) transmissions.

According to yet another feature, the method further includes either sequentially receiving the data blocks or receiving the data blocks in parallel.

In accordance with an alternative embodiment, a method for receiving encoded uplink acknowledgments to downlink transmissions includes transmitting in parallel a plurality of data blocks, such that each of the data blocks include an associated cyclic redundancy check (CRC). The method further includes receiving a single response sequence which indicates received status of all of the data blocks.

In accordance with another alternative embodiment, a portable device for encoding uplink acknowledgments to downlink transmissions includes a receiver configured to receive a plurality of data blocks, such that each of the data blocks include an associated cyclic redundancy check (CRC), and a processor configured to determine received status for each of the data blocks by checking the CRC of each of the data blocks. The portable device further includes a transmitter for transmitting a response sequence which indicates the received status of all of the data blocks.

In accordance with yet another embodiment, a transmitting entity operable in a wireless communication system and configured to receive encoded uplink acknowledgments to downlink transmissions includes a transmitter for transmitting in parallel a plurality of data blocks, such that each of the data blocks include an associated cyclic redundancy check (CRC), and a receiver for receiving a single response sequence which indicates received status of all of the data blocks.

In accordance with still yet another embodiment, a method for encoding uplink acknowledgments to downlink transmissions includes receiving a plurality of data blocks, such that each of the data blocks include an associated cyclic redundancy check (CRC), determining received status for each of the data blocks by checking the CRC of each of the data blocks, and generating a response bit according to the status. The method further includes mapping the response bit to a fixed length sequence to generate a mapped sequence, transmitting the mapped sequence in an uplink transmission, and repeating the mapping and transmitting for a predetermined time period.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be described in conjunction with a UE. However, such teachings apply also to other types of wireless terminals such as mobile terminals, mobile stations, and the like.

Spreading of Control Information Vectors in Uplink

Figure 2A:
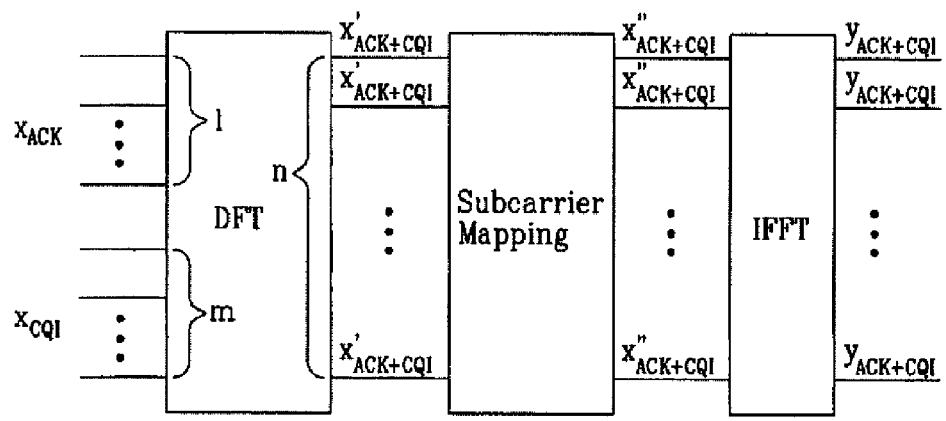
FIG. 2A shows a UE transmitting in the uplink to collectively spread the control information vectors to obtain a spread vector.
Figure 2B:
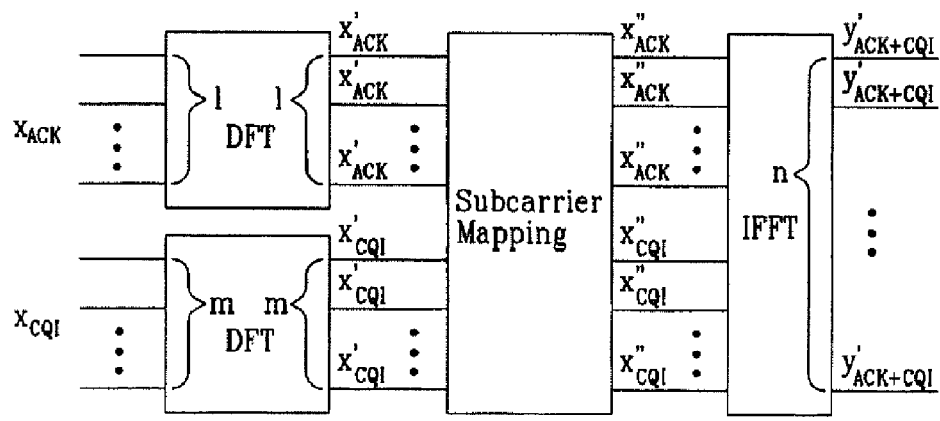
FIG. 2B shows another arrangement for uplink transmissions in a DFT-S-OFDM wireless communication system according to an alternative embodiment of the present invention.
Figure 2C:
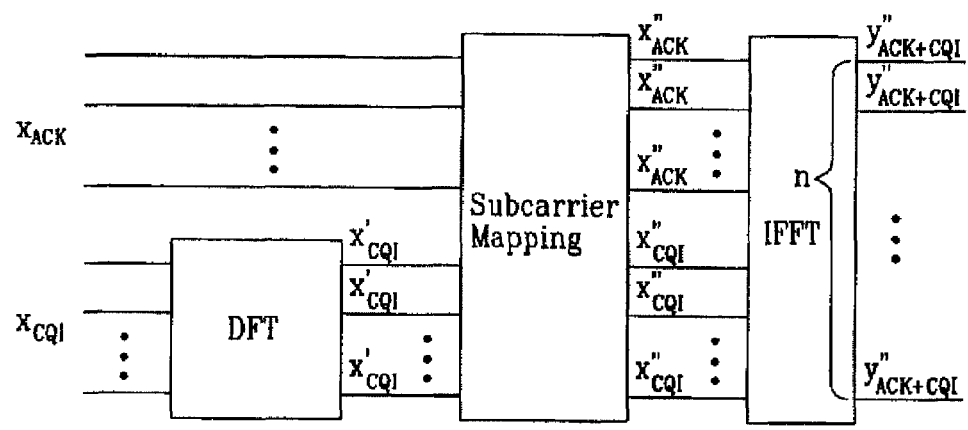
FIG. 2C shows yet another arrangement for uplink transmissions in a DFT-S-OFDM wireless communication system according to an alternative embodiment of the present invention.

FIGS. 2A-2C are block diagrams which illustrate various elements of an uplink transmitting entity operable within a DFT-S-OFDM wireless communication system in accordance with an embodiment of the present invention. Consider first a UE configured as the transmitting entity in such a communication system. The UE may receive and distinguish control information such as ACK/NACK, a channel quality indicator (CQI), and other types of non-data-associated control information. Such control information is not associated with data demodulation. Generally, an ACK/NACK is a vector that includes one or more bits which are based upon the number of cyclic redundancy codes (CRCs) inserted into the downlink signal. The CQI is a vector that generally includes a plurality of bits to report a channel quality state to an associated base station or Node B, for example. The CQI facilitates downlink scheduling at the base station. By way of non-limiting example, embodiments will be described in which the size of the ACK/NACK vector is "1" and the size of the CQI vector is "m."

FIG. 2A shows a UE transmitting in the uplink to collectively spread the control information vectors (sized 1+m through DFT) to obtain a spread vector ($X'_{ACK+CQI}$) with a size of n bits (n=1+m), without distinguishing between the ACK/NACK vector of size 1 and the CQI vector of size m. Another operation performs an inverse fast Fourier transform (IFFT) on vector ($X''_{ACK+CQI}$) obtained through subcarrier mapping to acquire and transmit time information ($y_{ACK+CQI}$).

In this scenario, if one UE transmits an ACK/NACK and another UE transmits CQI using the same resource block, it is difficult for a receiving base station to select an IDFT for despreading a vector $X'_{ACK+CQI}$ that is obtained by removing each subcarrier from a vector $X''_{ACK+CQI}$. The vector $X''_{ACK+CQI}$ may be obtained by the base station through a fast Fourier transform (FFT) which corresponds to the IFFT performed at the transmitting end. Signals transmitted by the UEs are typically indistinguishably spread in the vector $X''_{ACK+CQI}$ and the vector $X'_{ACK+CQI}$. This is because it may be necessary to distinguish between IDFTs used to analyze received signals from two or more UEs, if the UEs use the same resource block.

FIG. 2B shows another arrangement for uplink transmissions in a DFT-S-OFDM wireless communication system according to an alternative embodiment of the present invention. A UE configured to transmit according to this figure distinguishes and receives various types of control information (described above). In this example, the UE spreads the ACK/NACK and CQI control information using different DFTs before mapping these parameters to corresponding subcarriers. Since the ACK/NACK vector ($X_{ACK}$) of size 1 and the CQI vector ($X_{CQI}$) of size m are spread using different DFTs, their spread vectors ($X'_{ACK}$) and ($X'_{CQI}$) of size 1 and m, respectively, also include ACK/NACK information and CQI information.

The spread vectors ($X'_{ACK}$) and ($X'_{CQI}$) are shown mapped to corresponding subcarriers, which are subjected to the IFFT and subsequently transmitted to the base station. According to this embodiment, if one UE transmits an ACK/NACK and another UE transmits CQI using the same resource block, the base station can easily select IDFTs for despreading vectors $X'_{ACK}$ and $X'_{CQI}$ that are each obtained by respectively removing subcarriers from vectors $X''_{ACK}$ and $X''_{CQI}$. The vectors $X''_{ACK}$ and $X''_{CQI}$ may be obtained by the base station through a FFT corresponding to the IFFT that was performed at the transmitting end, which in the illustrated case is the UE.

FIG. 2B is an example which distinguishes between control information such as ACK/NACK and CQI. However, other types of information may be similarly distinguished using the illustrated techniques. For example, the techniques of this figure may also be applied to situations in which two or more control signals (or information) are received and spread using different DFTs before being mapped to a frequency resource for transmission through the uplink. This allows a receiving entity, which receives the uplink signal, to distinguish between the transmitted two or more types of control information through control information that is demapped from the frequency resource.

The embodiment of FIG. 2B separately spreads control information using separate DFTs, but alternatives are possible and envisioned by the present disclosure. For example, the separate DFT processes may alternatively include any process, provided that such processes allow the entity receiving the uplink signal to distinguish between the different types of control information.

FIG. 2C shows another arrangement for uplink transmissions in a DFT-S-OFDM wireless communication system according to an alternative embodiment of the present invention. In this embodiment, the transmitting UE, for example, directly maps ACK/NACK control information to a subcarrier. This is accomplished without performing DFT, and results in obtaining the vector $X''_{ACK}$. FIG. 2C further shows transforming CQI control information using a DFT, and then mapping the resulting spread vector $X'_{CQI}$ to a subcarrier to obtain a vector $X''_{CQI}$.

Generally, the size of the vector corresponding to the ACK/NACK information is smaller than the size of the vector corresponding to the CQI information. Thus the effects achieved by spreading the vector corresponding to the ACK/NACK information are relatively small. This embodiment is simplified to the extent that the DFT processing of the ACK/NACK signal is omitted. However, this embodiment achieves effects similar to those of the case of FIG. 2B since the base station can correctly distinguish between information items that have been subjected to a FFT. If desired, the embodiment of FIG. 2C may alternatively include any separate process, other than the separate DFT spreading, provided that such a process allows the receiving entity to distinguish between the different types of control information.

The embodiment of FIG. 2C may further include a structure for improving peak-to-average power ratio (PAPR) performance. For example, if the ACK/NACK signal is directly mapped to a subcarrier without DFT, and it is then subjected to IFFT for transmission, the compensation effects between DFT and IFFT may degrade the PAPR performance (relative to performance which may be achieved by the configuration of FIG. 2B). As such, a UE configured in accordance with FIG. 2C may select a specific subcarrier for improving the PAPR performance, and then map the ACK/NACK signal to the selected subcarrier.

Figure 3A:
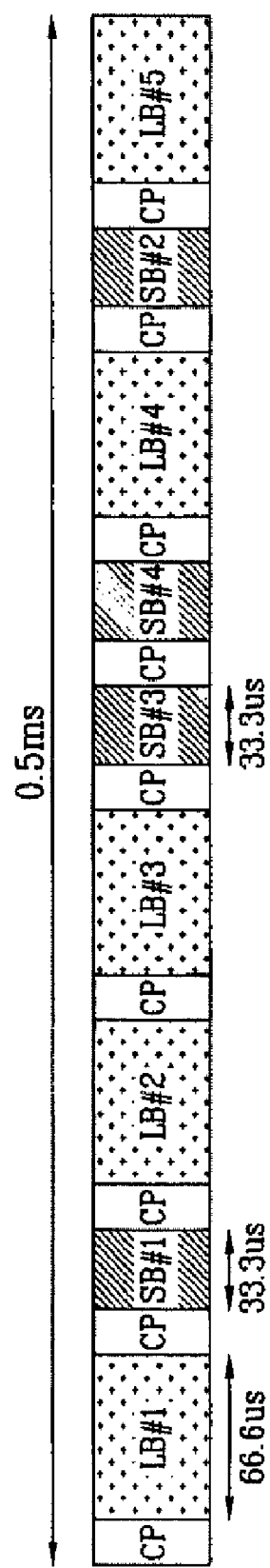
FIG. 3A depicts an uplink subframe format using time division multiplexing (TDM) in a DFT-S-OFDM wireless communication system.
Figure 3B:
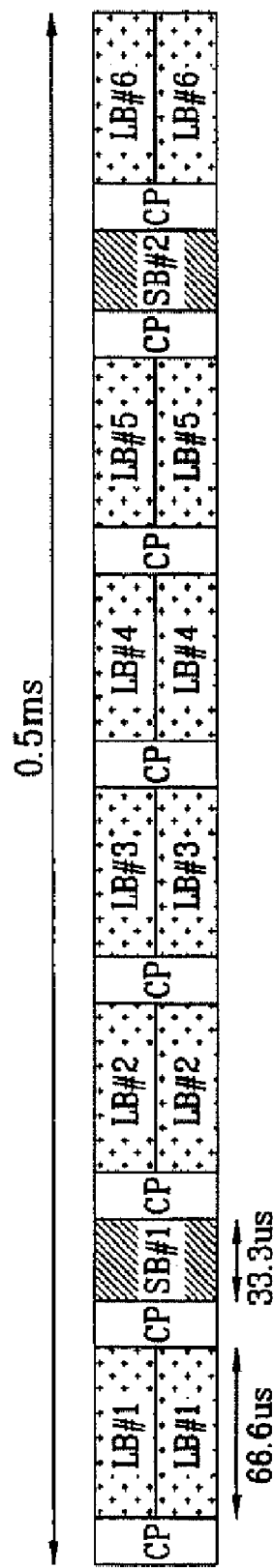
FIG. 3B depicts an uplink subframe format using frequency division multiplexing (FDM) in a DFT-S-OFDM wireless communication system.

FIG. 3A depicts an uplink subframe format using time division multiplexing (TDM) in a DFT-S-OFDM wireless communication system. FIG. 3B depicts an uplink subframe format using frequency division multiplexing (FDM) in a DFT-S-OFDM wireless communication system.

Generally, ACK/NACK control information in a DFT-S-OFDM wireless communication system is represented by either one bit, or a relatively small number of bits. Consequently, the bit error rate (BER) may be somewhat degraded because of various factors in a wireless channel. Typical multiplexing methods in the DFT-S-OFDM wireless communication system include TDM (FIG. 3A) and FDM (FIG. 3B). Accordingly, a transmitting UE in accordance with an embodiment will typically repeatedly transmit ACK/NACK information to improve the BER.

Consider the case in which TDM is used by several UEs. In such a scenario ACK/NACK information may be repeatedly transmitted in a long block (LB) allocated in a subframe (e.g., LB #3 of FIG. 3A) over a specific frequency. Such an arrangement will typically improve the BER characteristics.

Repeated transmissions over a specific frequency may be accomplished by sequentially transmitting ACK/NACK information over a frequency band, or by mapping ACK/NACK information to a specific sequence. DFT may optionally be performed on this ACK/NACK information. If desired, ACK/NACK information may also be repeatedly transmitted using block coding.

Consider now situations in which FDM is used to multiplex information transmitted from multiple UEs. In such scenarios, ACK/NACK information may be repeatedly transmitted in multiple LBs allocated in a subframe (e.g., LB #1-LB #6 of FIG. 3B). Such an arrangement will also typically improve the BER characteristics. In some cases, multiple ACK/NACK signals may be transmitted in response to downlink information using multiple antennas. In an embodiment, the number of ACK/NACK signals is equal to the number of CRCs inserted in the downlink data (as described above).

A UE may responsively transmit (uplink) a number of ACK/NACK signals corresponding to the number of received CRCs for situations in which a CRC is inserted in each portion of information transmitted through each of the antennas in the downlink. If the UE transmits a plurality of ACK/NACK signals in this manner, the UE may also repeatedly transmit the ACK/NACK signals a specific number of times. Such operations may be used to improve BER characteristics of the transmitted ACK/NACK signals.

For example, consider that the number of ACK/NACK signals is M. The M ACK/NACK signals may be denoted by $ACK/NACK_1$, $ACK/NACK_2$, ..., $ACK/NACK_M$, and the specific number of times is K. In this case, the ACK/NACK signals may be repeatedly transmitted according to the following:

$\{(ACK/NACK_{1-1}, ACK/NACK_{1-2}, \ldots ACK/NACK_{1-K})$, $\{(ACK/NACK_{2-1}, ACK/NACK_{2-2}, \ldots ACK/NACK_{2-K}), \ldots, (ACK/NACK_{M-1}, ACK/NACK_{M-2}, \ldots ACK/NACK_{M-K})\}$.

According to an alternative technique, ACK/NACK signals may be repeatedly transmitted according to the following:

$\{(ACK/NACK_{1-1}, ACK/NACK_{2-1}, \ldots ACK/NACK_{M-1})$, $\{(ACK/NACK_{1-2}, ACK/NACK_{2-2}, \ldots ACK/NACK_{M-2}), \ldots, (ACK/NACK_{1-K}, ACK/NACK_{2-K}, \ldots ACK/NACK_{M-K})\}$.

Figure 4A:
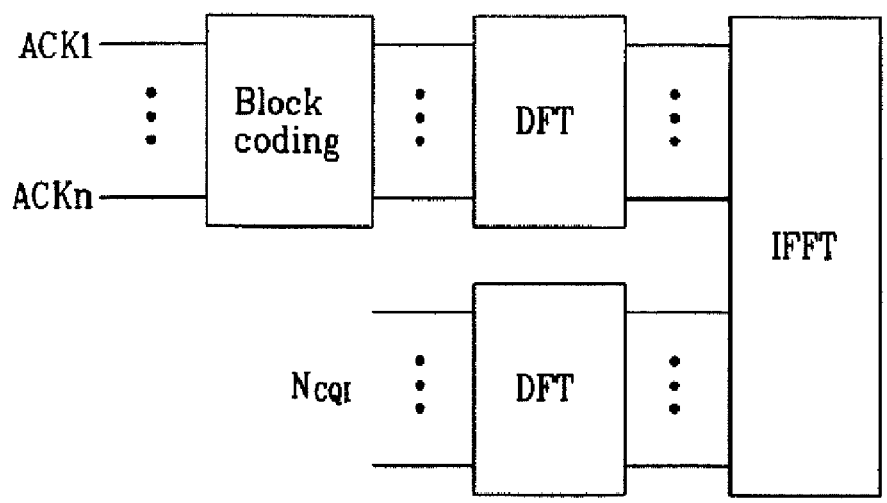
FIGS. 4A and 4B are block diagrams depicting techniques for reducing the BER in a transmitting UE operating within a DFT-S-OFDM wireless communication system according to an embodiment of the present invention.
Figure 4B:
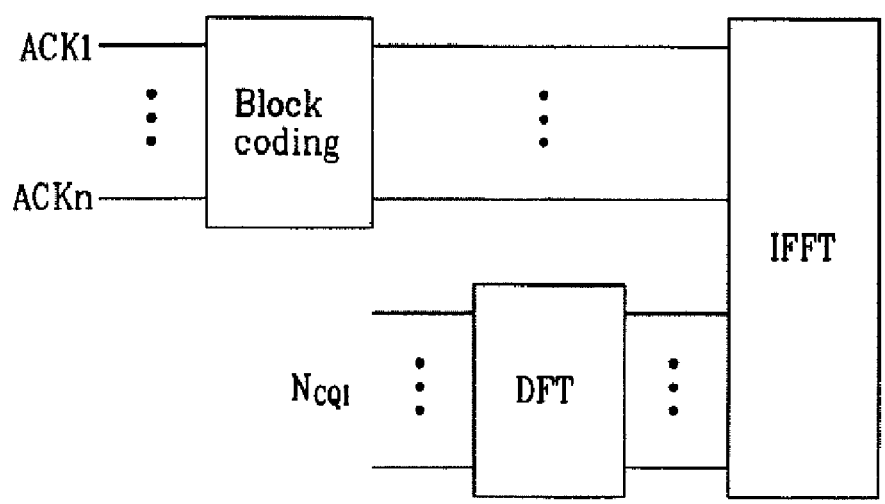

FIGS. 4A and 4B are block diagrams depicting techniques for reducing the BER in a transmitting UE operating within a DFT-S-OFDM wireless communication system according to an embodiment of the present invention. Consider first the situation in which the transmitting end transmits multiple ACK/NACK signals using multiple antennas. In such a case, the transmitting end may transmit the ACK/NACK signals by performing block coding on these signals using, for example, the techniques shown in FIGS. 4A and 4B.

Referring now to FIG. 4A, a technique is shown in which prior to transmitting, the ACK/NACK and CQI signals are first spread using separate DFTs. An alternative technique is shown in FIG. 4B. In this figure, the ACK/NACK signals are directly mapped to a subcarrier without spreading these signals through a DFT. However, the embodiment of FIG. 4B includes mapping the CQI signal to a subcarrier after spreading this signal using a DFT.

Multiple ACK/NACK signals for improving the PAPR and BER characteristics of ACK/NACK signals need not be directly transmitted, and instead may alternatively be mapped to a specific sequence to be transmitted. According to one technique, a specific sequence for mapping may be determined A sequence may be selected and a plurality of ACK/NACK signals mapped to the sequence. If desired, the sequence may be selected as the specific sequence for mapping according to its PAPR and BER characteristics. Another option includes transmitting ACK/NACK signals after modulating these signals using a conventional modulation technique such as BPSK or QPSK.

Figure 5:
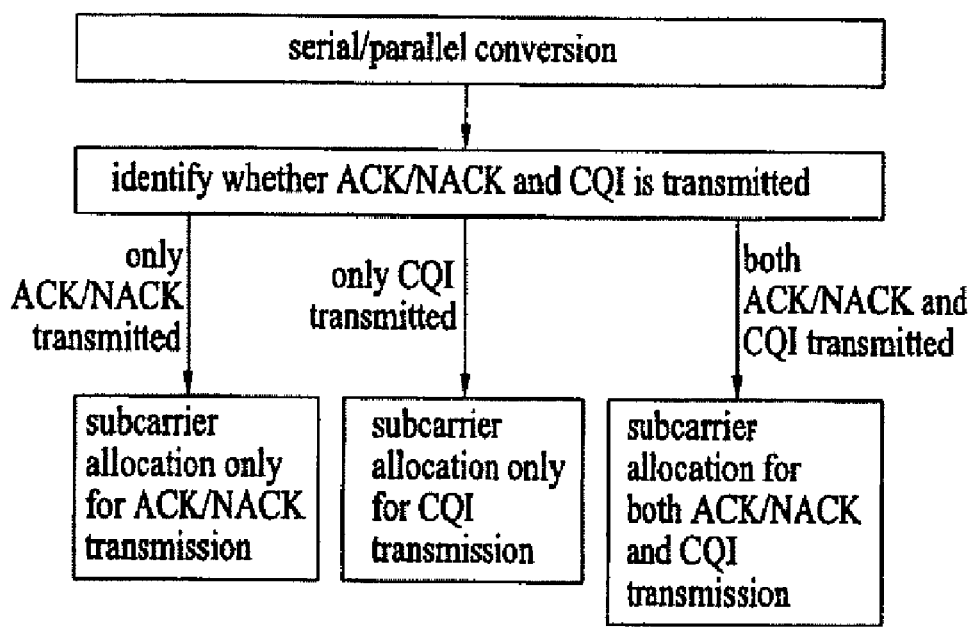
FIG. 5 is a block diagram depicting a method for selecting a subcarrier to be allocated according to an embodiment of the present invention.

FIG. 5 is a block diagram depicting a method for selecting a subcarrier to be allocated according to an embodiment of the present invention. This technique selects the subcarrier based upon transmission status of the ACK/NACK and CQI information and when such information is transmitted.

Allocating a sufficiently large number of subcarriers to non-data-associated control information in the uplink may reduce the number of subcarriers necessary to transmit UE data. ACK/NACK and CQI information may be separately transmitted, as described above. However, frequency resources may be efficiently allocated if subcarrier allocation is also performed when both the ACK/NACK and CQI information is transmitted. This is particularly the case where, without discriminating between the cases where only the ACK/NACK information is transmitted, only the CQI information is transmitted or where the ACK/NACK and CQI information are simultaneously transmitted.

Accordingly, a transmitting UE according to an embodiment of the present invention may distinguish and receive ACK/NACK and CQI information, among non-data-associated control information, to identify whether each of the ACK/NACK and CQI information is transmitted. Based on this identification, the UE may allocate a subcarrier suitable for each case in which only the ACK/NACK information is transmitted, or where only the CQI information is transmitted, or where both the ACK/NACK and CQI information are simultaneously transmitted. This embodiment distinguishes between ACK/NACK and CQI information among non-data-associated control information to identify whether each of the ACK/NACK and CQI information is transmitted. This embodiment efficiently manages frequency resources, and permits allocation of increased amounts of frequency resources for transmission, thereby achieving frequency diversity.

Advantages of various embodiments include the UE distinguishing ACK/NACK and CQI information, among non-data-associated control information which is not associated with data demodulation, and separately processing such information before it is mapped to frequency resources. This allows a base station to easily process received control information, even when the base station separately receives ACK/NACK and CQI information from multiple UEs through the same resource block. Moreover, improvement of the BER characteristics of the ACK/NACK information may be accomplished by repeatedly transmitting the ACK/NACK information in the uplink over a specific time period when FDM is employed, or over a specific frequency when TDM is employed.

When multiple ACK/NACK signals are transmitted, improvement of the PAPR and/or BER characteristics may also be accomplished by performing processes on the transmitted ACK/NACK signals. Examples of such signals include block coding, mapping to a specific sequence, and modulation through BPSK or QPSK.

Allocating Frequency Resource

Figure 6:
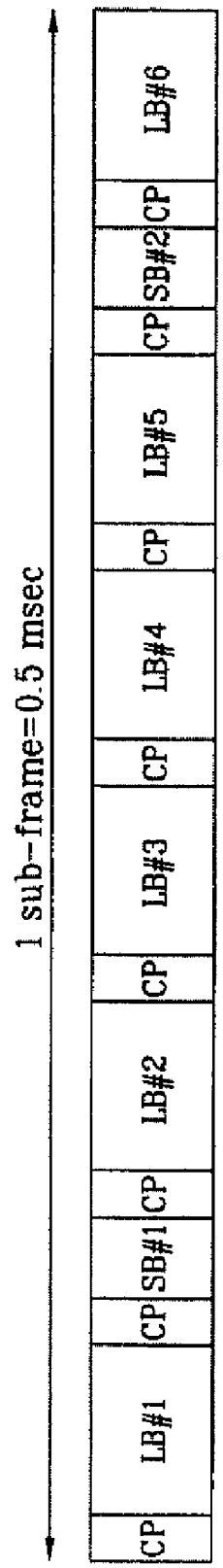
FIG. 6 shows an uplink subframe format.

Additional alternative embodiments relate to allocating frequency resources for ACK/NACK transmissions in uplink multi-carrier or single-carrier (SC) FDMA systems. FIG. 6 shows an uplink subframe format. In this figure, a long block (LB) is used for data and control information transmissions, and a short block (SB) is used for pilot and data transmissions.

Uplink transmission by the UE may be classified into the following cases:
 UE data, pilot, data-associated control;
 UE data, pilot, data-associated control, non-data-associated control; and
 Pilot, non-data-associated control.

Figure 7:
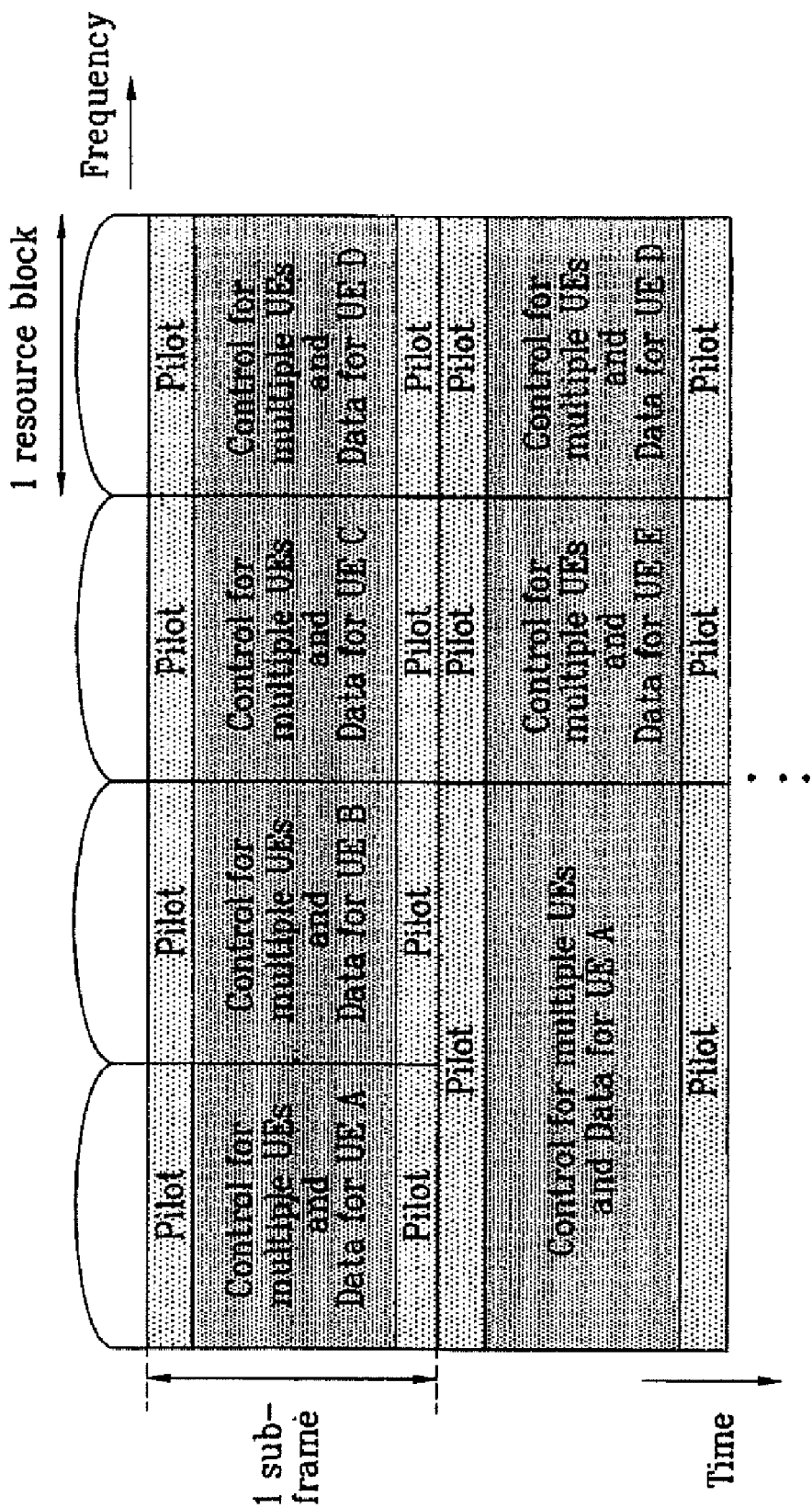
FIGS. 7 and 8 depict uplink multiplexing schemes.
Figure 8:
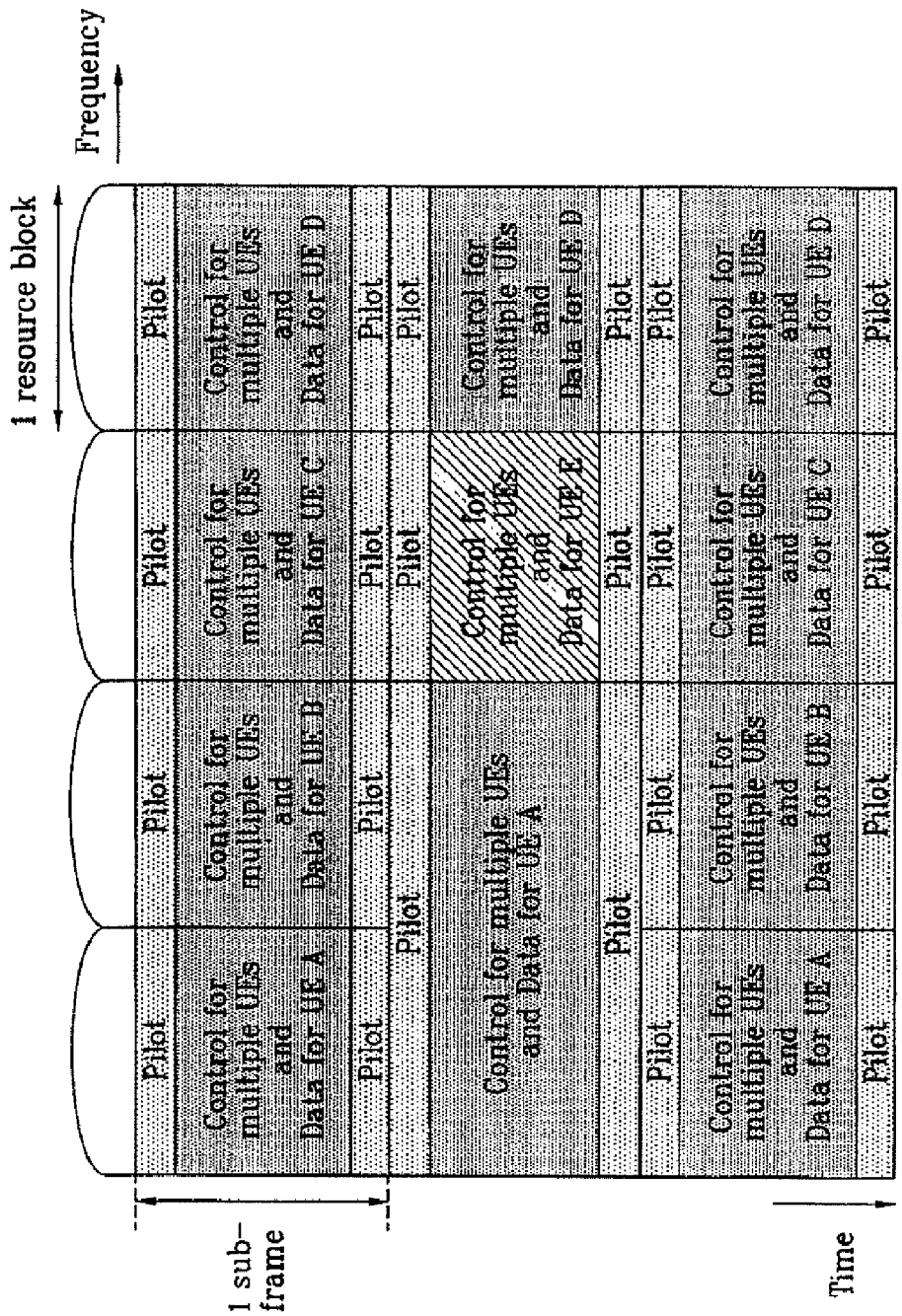

These cases may be multiplexed using, for example, the various multiplexing techniques shown in FIG. 7 and FIG. 8. The subframe format of FIG. 6 includes multiplexing data-associated control information and non-data-associated control information with UE data, and simultaneously multiplexing non-data-associated control information of several UEs.

In FIG. 7, although data-associated control information and UE data are multiplexed, a predetermined time-frequency domain is decided for the transmission of non-data-associated control information of several UEs. If UE data exists, non-data-associated control information is shown transmitted on the band for the transmission of UE data, instead of the band decided for the non-data-associated control information on which UE data is transmitted. A benefit of this technique is to maintain the SC-FDMA characteristics.

As shown in FIGS. 7 and 8, band allocations of UE data and non-data-associated control are performed in the same manner. In particular, when the UE data corresponds to localized allocation, the localized allocation is applied to the non-data-associated control as well. However, ACK/NACK information among the non-data-associated control information has a size of one bit and is therefore unable to be channel coded. Consequently, iteration of the ACK/NACK information may be performed to obtain a specific error rate.

Figure 9A:
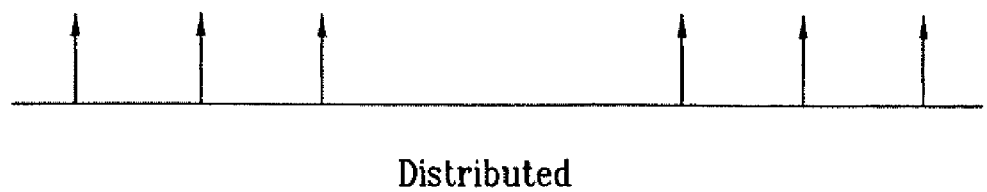
FIGS. 9A-9C depict embodiments which relates to allocating a frequency resource for ACK/NACK signal transmission in the uplink of a SC-FDMA/OFDMA system.
Figure 9B:
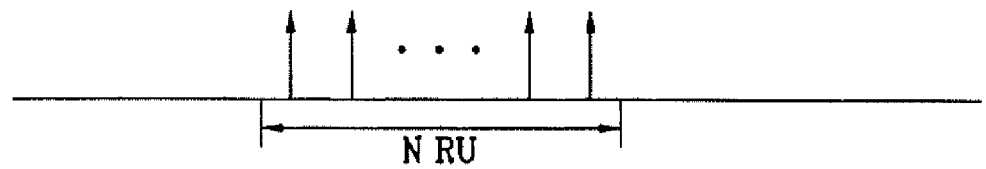
Figure 9C:

FIGS. 9A-9C depict embodiments which relate to allocating a frequency resource for ACK/NACK signal transmission in the uplink of a SC-FDMA/OFDMA system, and variations thereof In general, there are two techniques for allocating a frequency resource in the uplink. The first technique being a distributed method of arranging transmission data with the same interval on entire frequency bands (FIG. 9A). The second technique being a localized method of arranging transmission data on a specific frequency band (FIGS. 9B, 9C).

Although the ACK/NACK signal is typically one bit in size, iteration of this signal may be performed to obtain a specific error rate. For example, consider that the ACK/NACK signal obtained from iteration is transmitted via N resource units (RU). In transmitting the ACK/NACK signal iterated using a localized method though N RUs, if the ACK/NACK is smaller than a frequency resource occupied by the N RUs, the two additional methods may also be implemented. One technique is to allocate an iterated ACK/NACK signal to continuous frequency resources, while the other technique is to arrange the ACK/NACK signal on N RUs using, for example, an even interval. Accordingly, techniques for allocating frequency resources for ACK/NACK transmission may be summarized as follows:
 Distributed;
 Localized;
 Pure localized; and
 Distributed within allocated frequency resources.
Multiple Codeword ACK/NACK Yet another embodiment relates to HARQ in a mobile communication system, and more particularly, to an apparatus for transmitting ACK/NACK signal in a multiple codeword (MCW) type MIMO wireless system. As will be described, this embodiment is suitable for a wide scope of applications including, for example, transmitting the ACK/NACK signal using multiple MCW type transmitting and receiving antennas.

In general, multiple transmitting and receiving antennas may be used to raise the data rate in a mobile communication system. Data transmission using multiple antennas may be accomplished using two primary techniques. First, data may be transmitted in a transmit diversity format. In this case, although a data rate is not raised, a signal to noise ratio (SNR) of a received signal is raised to enable stable operation. This is because the same data is transmitted via several antennas. The second technique includes transmitting data in a spatial multiplexing format. In this case, simultaneously transmitting several independent data streams raises the data rate. The transmit diversity transmission is efficient in an area having a low SNR, whereas the spatial multiplexing transmission is efficient in an area having a high SNR.

Figure 10A:
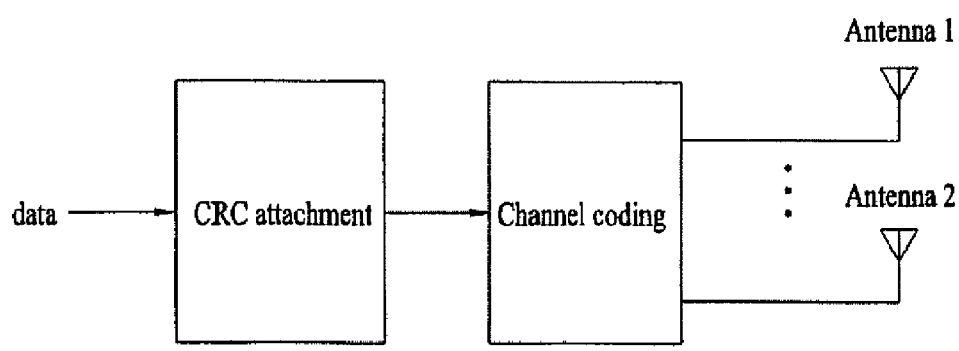
FIGS. 10A and 10B are block diagrams depicting SCW and MCW transmitting terminals configured for use in a MIMO wireless mobile communication system.
Figure 10B:
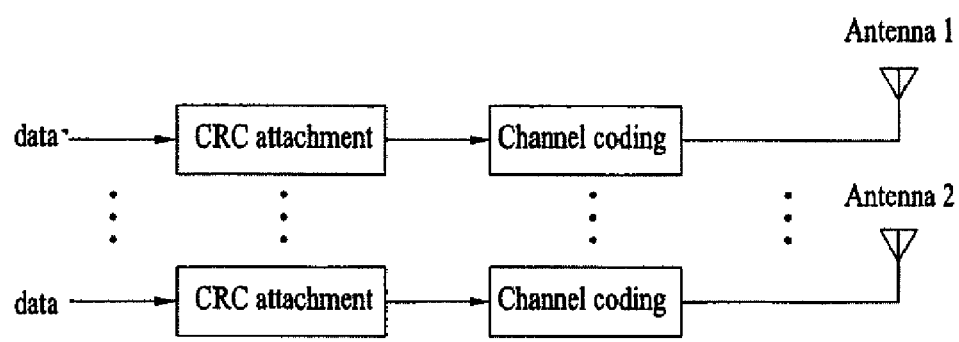

FIGS. 10A and 10B are block diagrams depicting SCW and MCW transmitting terminals configured for use in a MIMO wireless mobile communication system. It is understood that in some situations, a plurality of data streams can be simultaneously transmitted. For instance, coding may be performed by one channel encoder, and then the data is divided into a plurality of data streams. This technique is often referred to as transmitting using a single codeword (SCW).

Figure 11:
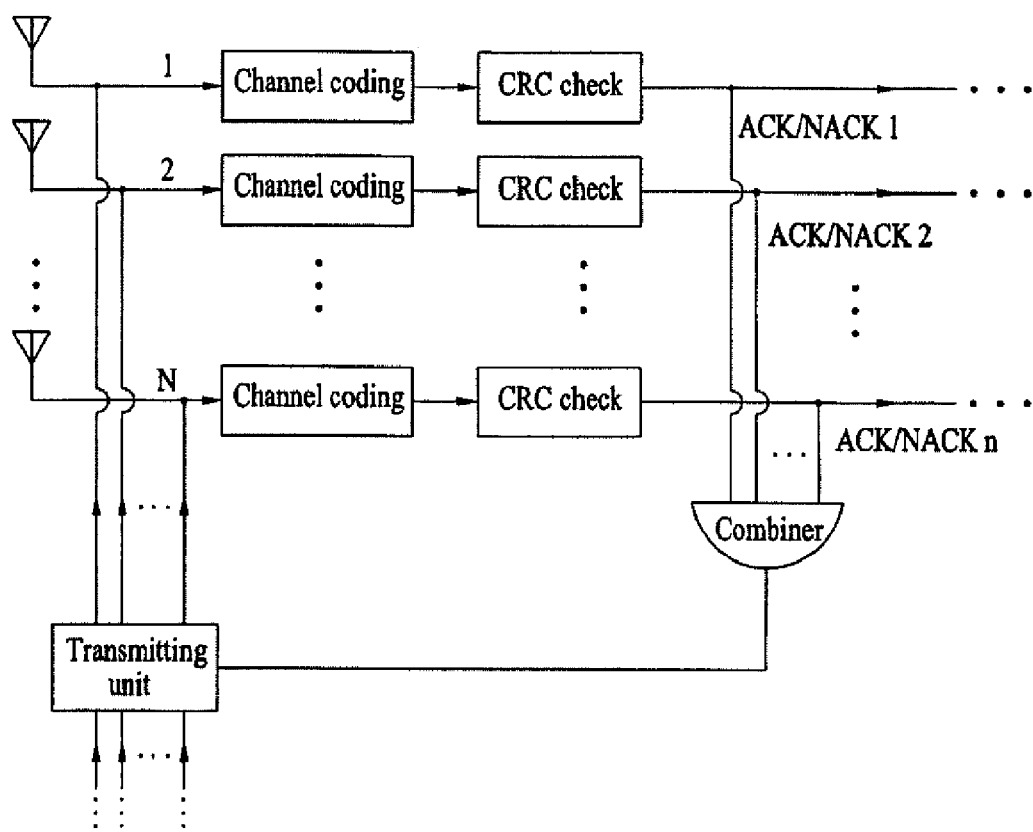
FIG. 11 is a block diagram of an ACK/NACK transmitting apparatus according to an embodiment of the present invention.

FIG. 11 is a block diagram of an ACK/NACK transmitting apparatus according to an embodiment of the present invention. This example provides a technique for transmitting multiple streams which includes individually coding a plurality of data streams via a channel encoder, and then transmitting the encoded data streams via a plurality of transmitting and receiving antennas. This technique is often referred to as transmitting using a multiple codeword (MCW).

SCW techniques include coding one block which is then divided. Since one CRC for error checking is attached to each block, a receiver would typically transmit only one ACK/NACK signal. On the other hand, using MCW, several blocks are coded and then turned into a data stream. If CRC is attached per block, the ACK/NACK signal should be transmitted for each data stream.

In general, the MCW is able to obtain a data rate higher than that of the SCW. Consequently, the MCW is commonly used despite the increase of ACK/NACK information to be transmitted. However, in situations in which the MCW transmits an ACK/NACK signal for each data stream, a receiver should secure radio resources for a plurality of ACK/NACK transmissions. This increase of control information decreases radio resources for the data transmission, resulting in degraded system efficiency.

Various aspects and embodiments of the present invention will now be described. In general, these examples include an apparatus for transmitting ACK/NACK signals in MCW type MIMO wireless system. For example, an apparatus for transmitting ACK/NACK signals in a MCW type MIMO wireless system by which a number of ACK/NACK signals to be transmitted can be reduced by maintaining a high data rate MCW.

One aspect includes transmitting an ACK/NACK in a wireless communication system using a plurality of MCW type transmitting and receiving antennas. Various operations include generating a plurality of ACK/NACKs corresponding to a number of error detection codes inserted in a plurality of data streams received via a plurality of antennas, and generating an ACK/NACK by combining a plurality of the ACK/NACKs, and transmitting the generated ACK/NACK via the antenna.

Another aspect includes generating a plurality of ACK/NACKs corresponding to a number of error detection codes inserted in a plurality of data streams received via a plurality of antennas, and grouping a plurality of the ACK/NACKs. The method further includes generating one ACK/NACK per group by combining a plurality of the grouped ACK/NACKs into a plurality of such groups, and transmitting the generated ACK/NACK groups via the antenna.

One aspect includes, in the grouping operation, grouping a plurality of the ACK/NACKs according to types of corresponding data streams.

Another aspect utilizes the error detection code as a CRC code.

Yet another aspect includes transmitting the received data streams for one timeslot via a plurality of the transmitting antennas.

Still yet another aspect includes combining a plurality of the ACK/NACKs by an AND operation.

In an embodiment, an apparatus for transmitting an ACK/NACK in a wireless communication system using a plurality of MCW type transmitting and receiving antennas includes an error checking unit generating a plurality of ACK/NACKs corresponding to a number of error detection codes inserted into a plurality of data streams received via a plurality of antennas. The apparatus further includes a signal combining unit generating one ACK/NACK by combining a plurality of the ACK/NACKs, and a signal transmitting unit transmitting the generated ACK/NACK via the antenna.

In another aspect, an apparatus includes a control unit grouping a plurality of the ACK/NACKs, a signal combining unit generating one ACK/NACK per group by combining a plurality of the grouped ACK/NACKs into a plurality of groups, and a signal transmitting unit transmitting the generated ACK/NACK groups via the antenna.

According to an aspect, the control unit groups a plurality of the ACK/NACKs according to the types of corresponding data streams.

One aspect utilizes the error detection code as an CRC code, and the received data streams are transmitted for one timeslot via a plurality of the transmitting antennas, and the signal combining unit combines a plurality of the ACK/NACKs by an AND operation.

Referring again to FIG. 11, a receiving terminal includes a plurality of antennas. When independent data is transmitted via a plurality of antennas to achieve a high data rate, the number of antennas of a receiving terminal should be equal to or greater than that of the antennas of the transmitting terminal FIG. 11 shows n antennas to indicate that n information streams are received.

Information (e.g., n information in FIG. 11) received via a plurality of antennas are decoded in correspondence to the channel coding technique performed by the transmitting terminal. A CRC checking unit then performs an error check using CRC which is included in each of the decoded information streams. As a result of performing this CRC checking, if an error exists, the CRC checking unit generates a NACK. If there is no error, the CRC checking unit generates an ACK. Accordingly, when n different information streams are received in parallel, n ACK/NACKs will be transmitted. In this case, the n received data streams may be assumed as data streams transmitted for one timeslot via n transmitting antennas. If desired, the information streams within a certain timeslot may be simultaneously processed.

FIG. 11 shows n ACK/NACKs inputted to a combiner to be combined into one ACK/NACK signal. For example, n ACK/NACKs may be combined into one ACK/NACK. An AND operation is carried out to combine these signals into one ACK/NACK. In particular, consider n ACK/NACKs such as ACK/NACK1, ACK/NACK2, ... , ACK/NACKn. The combined ACK/NACK can be expressed according to the following:

$$\text{ACK/NACK(Combined)}=\text{ACK/NACK1} \cap \text{ACK/NACK2} \cap \ldots \cap \text{ACK/NACK}n,$$

where if data is successfully received, each of ACK/NACK1 to ACK/NACKn can have a value of 1. Otherwise, each of these ACK/NACKs can have a value of 0.

If the combined ACK/NACK indicates 1, this could refer to the entire n data as being successfully received. If the combined ACK/NACK indicates 0, this could refer to at least one of the n data as not being successfully received. Consequently, a frequency resource for control information transmission can be efficiently allocated.

Figure 12:
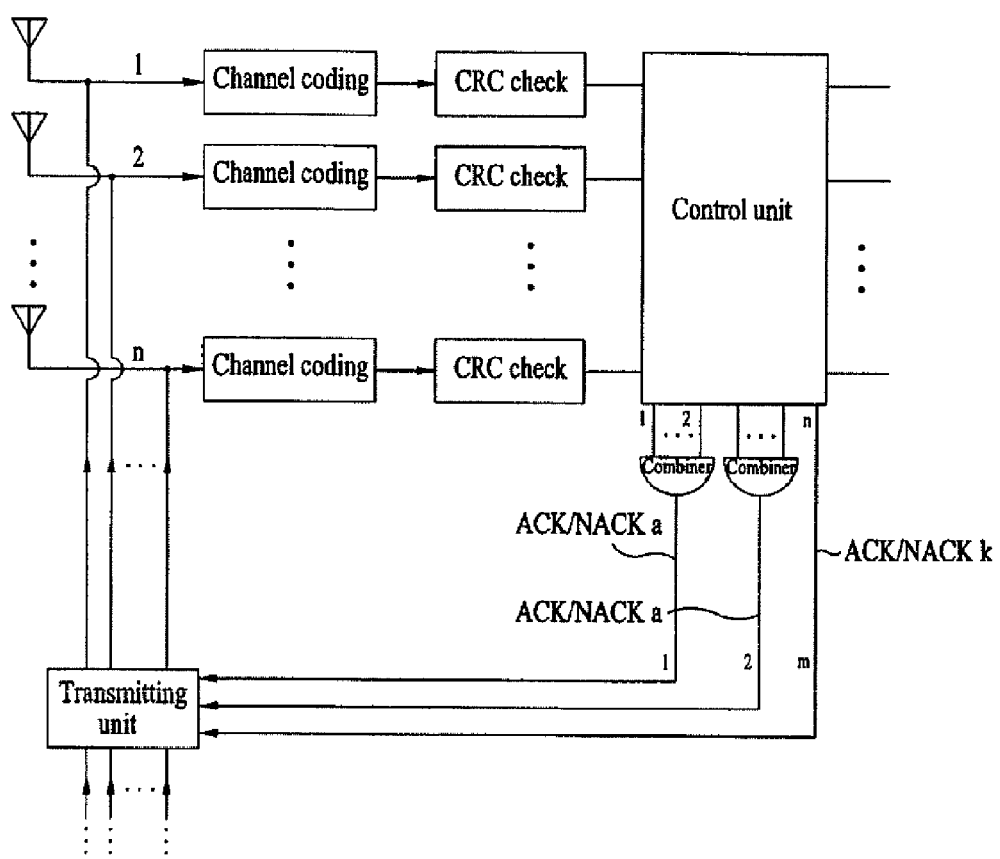
FIG. 12 is a block diagram of an ACK/NACK transmitting apparatus according to another embodiment of the present invention.

FIG. 12 is a block diagram of an ACK/NACK transmitting apparatus according to another embodiment of the present invention. In this embodiment, a control unit is added to the configuration shown in FIG. 11, as well as a plurality of combiners.

In FIG. 12, n ACK/NACKs respectively generated by CRC checking units are inputted to a control unit. The control unit then groups the inputted ACK/NACKs into a plurality of groups. These groups can be classified according to a type of received data stream. For instance, if a prescribed portion of data is important in checking a successful data reception and needs to be separately processed, it can be separately grouped. Alternatively, these ACK/NACKs can be divided into a prescribed number of groups to appropriately select the size of control information to be transmitted regardless of the type of the received data.

As mentioned above, the grouped ACK/NACK signals are combined by a plurality of combiners to generate one ACK/NACK signal per group. In general, ACK/NACKs corresponding to a specific group may include a single ACK/NACK. In this aspect, a corresponding ACK/NACK is processed in the same manner as other ACK/NACKs having undergone the combining operation without passing through a separate operation for the ACK/NACK signal combining.

Consider further that the number of groups selected by the above principle may be equal to or smaller than m, and thus m ACK/NACKs may be obtained. The m ACK/NACKs are inputted to a transmitting unit and then transmitted via an antenna.

The embodiments of FIGS. 11 and 12 have been described with regard to the error detection code implemented using CRC code. Alternatively, a random error detection code that is a signal requested by a receiving terminal may be used to be informed whether a data transmission is successful.

Various embodiments enable a receiving terminal to transmit ACK/NACK at the SCW level despite using MCW having a data rate that is higher than that of the SCW. Alternatively, if transmission of the n data streams falls below a certain critical count, an ACK/NACK indicating a presence or non-presence of a transmission success for each of the n data streams can be transmitted without being combined instead of repeating transmissions of the entire n data streams. Alternatively, consider the situation in which transmission of specific data fails a certain number of times on the assumption that a plurality of received data streams can be individually discriminated. ACK/NACK information for indicating a presence or non-presence of transmission success of the specific data stream is independently transmitted without combining and the remainder of ACK/NACK signals are combined and transmitted.

It is understood that an ACK/NACK is an example of control information which indicates whether data transmitted by a transmitting terminal is successfully received by a receiving terminal ACK/NACK is commonly used for HARQ. However, a random signal, for example, performing the above-noted functions may be used as a replacement for ACK/NACK.

Subcarrier Mapping in Uplink

Various additional embodiments relate to subcarrier mapping in the uplink. In particular, such embodiments include arranging transmission data in a frequency resource allocated to the uplink in a wireless communication system using a plurality of subcarriers and a transmitter implementing the same.

Figure 13A:
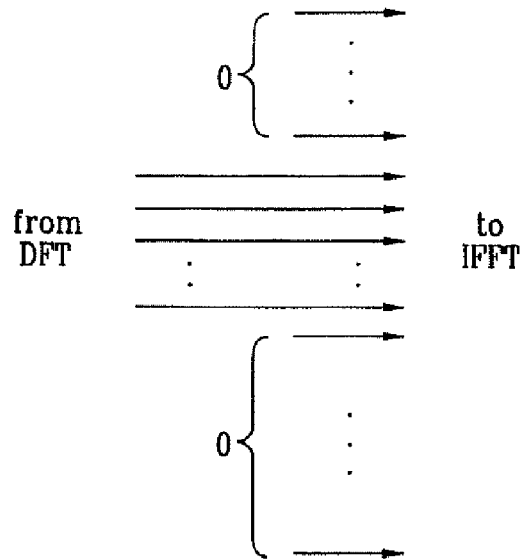
FIG. 13A depicts localized allocation of a number of subcarriers.

FIG. 13 depicts localized allocation of a number of subcarriers. In this figure, localized allocation refers to user data that is transmitted via a prescribed number of subcarriers, distributed adjacent to a predetermined band, among the entire band of a frequency resource allocated for the uplink. User data is transmitted via subcarriers on a predetermined band only by inputting 0 to the remaining subcarriers.

According to the localized allocation, only a partial band of an uplink frequency resource is used. Yet, if transmission data is transmitted by a resource unit including a predetermined number of subcarriers, the transmission data tends to be intensively arranged in a predetermined area within resource units consecutively allocated to a partial band of the frequency resource.

Figure 13B:
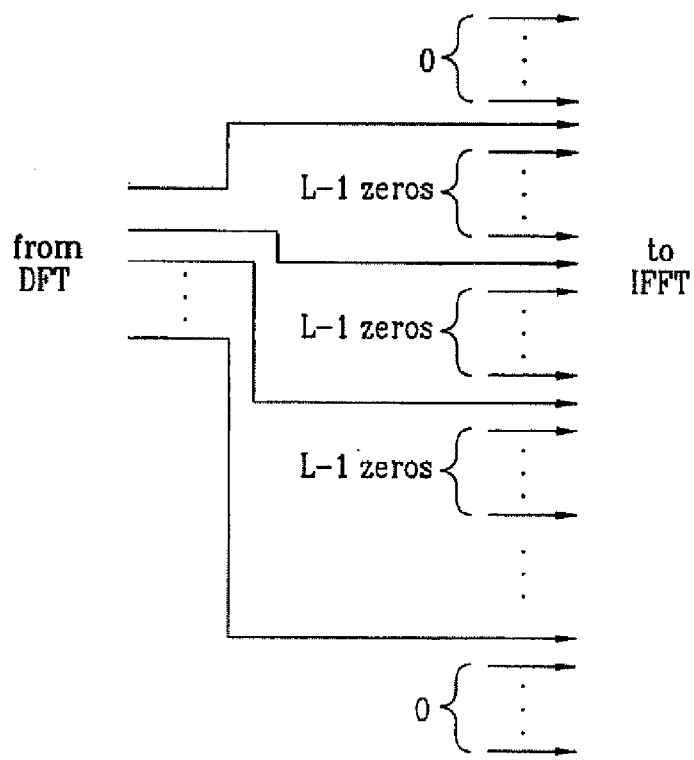
FIG. 13B depicts distributed allocation of a number of subcarriers.

FIG. 13B depicts distributed allocation of a number of subcarriers. In this figure, distributed allocation refers to user data transmitted via subcarriers equally distributed across entire bands of a frequency resource allocated for the uplink. By inputting 0 to the remaining subcarriers, the system can transmit the user data using only the distributively allocated specific subcarriers.

The distributed allocation can distributively transmit the data across the entire bands of the uplink frequency resource to raise frequency diversity. So, it is advantageous that the distributed allocation is strong against channel influence. However, as a pilot interval in transmitting a pilot using a short block gets wider than that in transmitting a pilot using a long block, channel estimation performance may be degraded.

By way of overview, various embodiments include a method of arranging subcarriers for retransmission data distributively within an allocated partial band and a transmitter supporting the same. Channel influence may be minimized using localized allocation.

One aspect includes arranging subcarriers for transmission data distributively and a transmitter supporting the same. A predetermined number of the subcarriers are bound together to be distributively arranged according to localized allocation.

Another embodiment relates to a method of arranging subcarriers in the uplink, in which the subcarriers for data transmission are arranged in a frequency resource allocated for the uplink. One operation includes arranging the subcarriers for data transmission in a local band of the frequency resource allocated for the uplink, such that the subcarriers are distributed with an equal space for a whole part of the local band.

According to one feature, the transmission data is a control signal repeatedly coded with prescribed bits.

In another feature, the transmission data is transmitted via N (N=1, 2, 3, . . . ) resource units, each having a prescribed number of subcarriers, and wherein the subcarriers are arranged in a manner of arranging the N resource units in the local band of the frequency resource allocated for the uplink and distributing the subcarriers with the equal space across a whole band occupied by the N resource units.

In another aspect, a method of arranging subcarriers in the uplink, in which the subcarriers for data transmission are arranged in a frequency resource allocated for the uplink, includes grouping the subcarriers for the data transmission by at least two of the subcarriers across a whole band of the frequency resource allocated for the uplink, wherein the grouped subcarriers are distributed with an equal space.

Another feature relates to the transmission data transmitted via N (N=1, 2, 3, . . . ) resource units, each having a prescribed number of subcarriers, and wherein the subcarriers are arranged in a manner of distributing the N resource units in the whole band of the frequency resource allocated for the uplink with the equal space. The method further includes grouping the subcarriers by at least two of the subcarriers, and arranging the grouped subcarriers within each of the N resource units.

In yet another aspect, an apparatus includes a subcarrier arranging module arranging the subcarriers for the data transmission in a local band of the frequency resource allocated for the uplink, wherein the subcarriers are distributed with an equal space for a whole part of the local band.

In one feature, the transmission data is transmitted via N (N=1, 2, 3, . . . ) resource units, each having a prescribed number of the subcarriers, and wherein the subcarriers are arranged in a manner of arranging the N resource units in the local band of the frequency resource allocated for the uplink and distributing the subcarriers with the equal space across a whole band occupied by the N resource units.

In another aspect, a transmitting apparatus for arranging subcarriers in the uplink includes a subcarrier arranging module grouping the subcarriers for the data transmission by at least two of the subcarriers across a whole band of the frequency resource allocated for the uplink, wherein the grouped subcarriers are distributed with an equal space.

Figure 14:
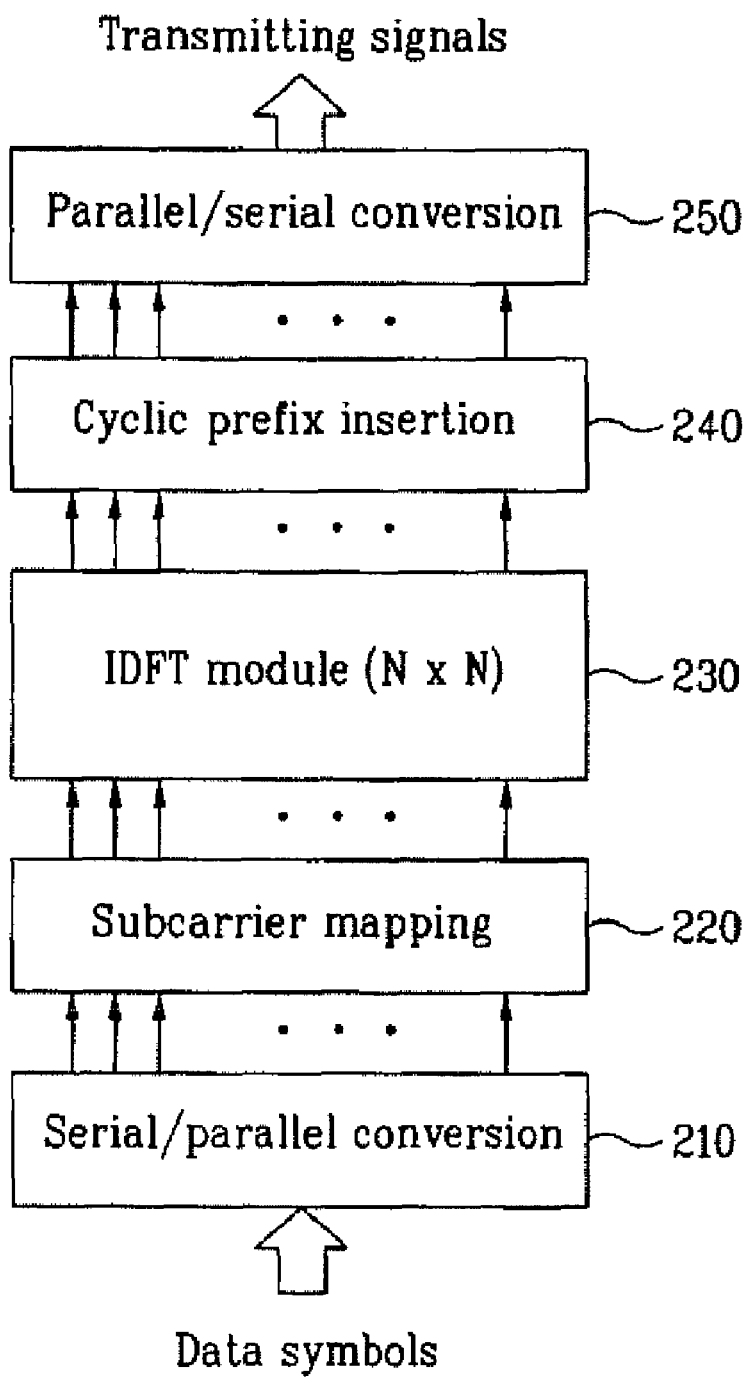
FIG. 14 is a block diagram depicting a method for uplink transmission using OFDM.

FIG. 14 is a block diagram depicting a method for uplink transmission using OFDM. At block 210, a high data rate data stream (or data symbol) is inputted in series and converted to a plurality of data streams having slow data rates via a serial to parallel converter. Each of the parallel-converted data streams is multiplied by a corresponding subcarrier through a subcarrier mapper (block 220), and then transformed into a time-domain signal by IDFT (block 230). Block 240 inserts a cyclic prefix in the time-domain signal for preventing channel interference. The signal is converted to a serial signal and then transmitted to a receiving terminal (block 250).

It is understood that in a system performing modulation using a plurality of orthogonal subcarriers, OFDMA refers to the situation in which a multiple access method is accomplished by providing portions of available subcarriers to different users. OFDMA provides different users with frequency resources, such as subcarriers. Since the frequency resources are independently provided to a plurality of users, they are not overlapped with each other.

Since orthogonality is maintained between subcarriers, a high data rate can be obtained. A possible problem that may arise relates to the peak to average power ratio (PAPR). To minimize or effectively eliminate this problem, spreading is carried out in the frequency domain using a DFT matrix. This operation is typically performed before the generation of an OFDM signal. The result of the spreading is modulated by OFDM to obtain a single carrier transmission. This situation may be referred to as DFT-S-OFDMA.

Figure 1:
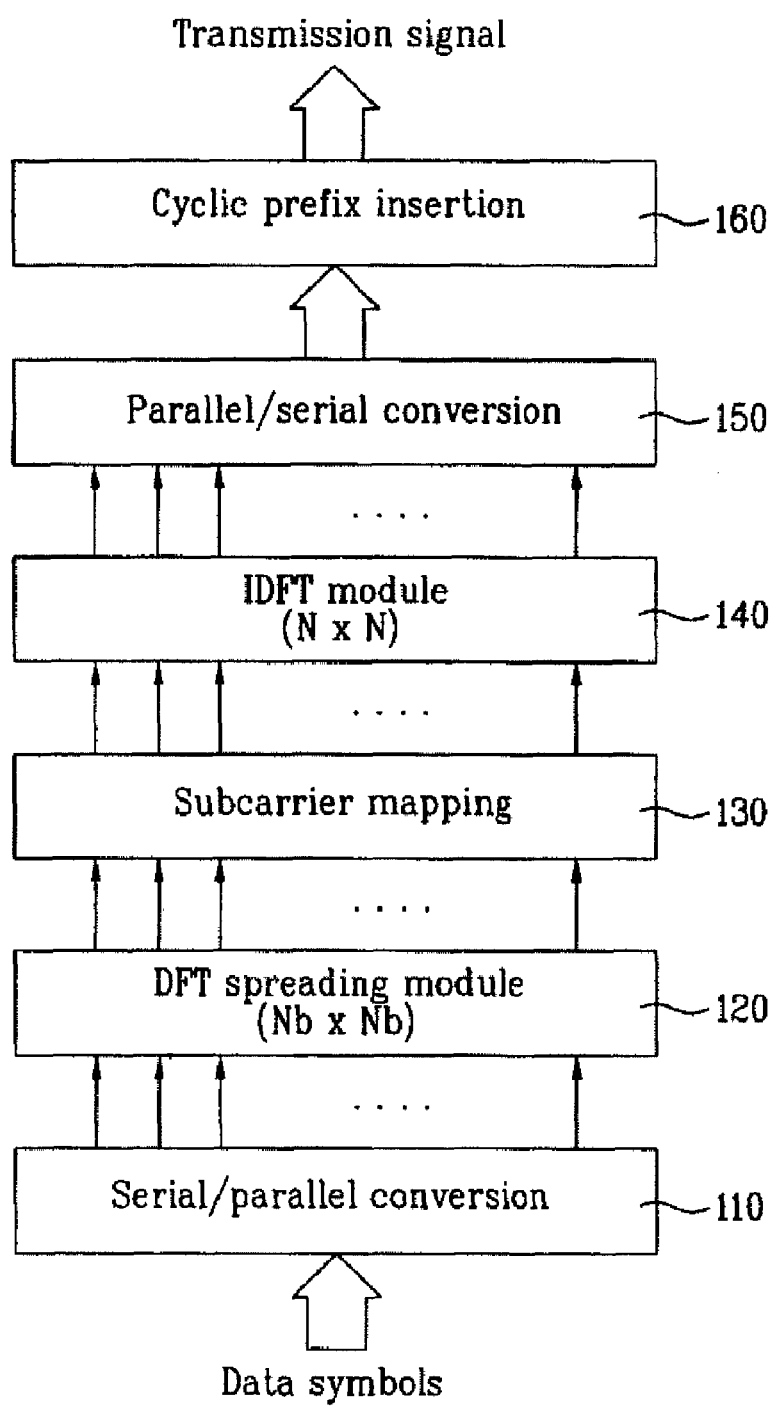
FIG. 1 is a flowchart depicting the generation of a transmission signal according to a conventional DFT-S-OFDMA system.
Figure 15:
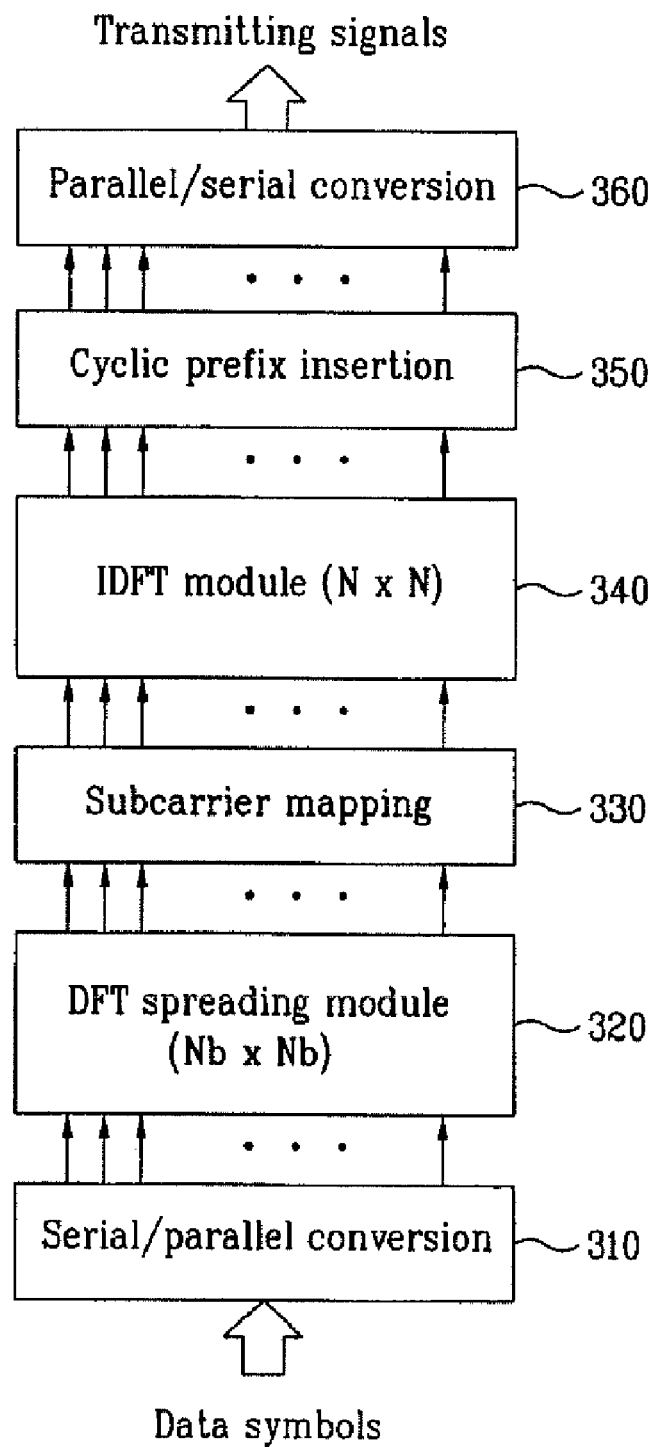
FIG. 15 is a flowchart depicting the generation of a transmission signal according to DFT-S-OFDMA.

FIG. 15 is a flowchart depicting the generation of a transmission signal according to DFT-S-OFDMA. The technique is similar in many respects to that which is shown in FIG. 1, such that blocks 310-340 generally correspond to blocks 110-140 of FIG. 1. A distinction is that cyclic prefix insertion (block 350) is shown occurring prior to the parallel/serial conversion of block 360.

In a multi-carrier system using OFDMA or DFT-S-OFDM, user equipment data, pilot, control information, and the like, are transmitted in the uplink. If the user equipment data is transmitted in the uplink, corresponding control information is transmitted in the downlink. Using the corresponding control information, a transmission band is allocated or a data transport format is decided.

There are two general types of pilot signals. A CQ pilot is used to measure channel quality to perform UE scheduling and adaptive modulation and coding. A data pilot may also be used for channel estimation and data demodulation in data transmission. The data pilot is the pilot transmitted on a corresponding domain. Control information may include data-associated control information and non-data-associated control information, as described above. The above-noted UE data, pilot, and control information may be transmitted via a subframe having a predetermined structure. An example includes a FDD subframe for the uplink proposed by 3GPP LTE. A suitable subframe is depicted in FIG. 3A.

Referring back to FIG. 3A, a cyclic prefix (CP) is shown inserted between the respective blocks to avoid inter-block interference. In this arrangement, the long block (LB) is usable for transmission of uplink data or control information, and the short block (SB) is usable for transmission of uplink data or a pilot.

One method for multiplexing the subframe first includes multiplexing the UE data, pilot, and data-associated control information. Another method for multiplexing includes multiplexing the UE data, pilot, data demodulation associated control information, and data demodulation non-associated control information. A third method for multiplexing includes multiplexing the pilot and data demodulation non-associated control information.

Referring back to FIG. 7, data demodulation associated control information and data demodulation non-associated control information for a specific user are shown multiplexed with UE data of a corresponding user, and simultaneously, data demodulation non-associated control information for other users is multiplexed together. This results in each resource block including the same kind of uplink data.

Referring back to FIG. 8, data demodulation associated control information for a specific user and UE data are multiplexed, but data demodulation non-associated control information for multiple users including the specific user is transmitted via a separately provided predetermined time-frequency domain (area indicated by slashes in FIG. 8). Various kinds of data carried by the subframes, such as that which is shown in FIGS. 7 and 8, may be multiplexed in the time domain to maintain the advantage of the DFT-S-OFDM having low PAPR.

Since UE data for a specific user and data demodulation non-associated control information are multiplexed and transmitted for the same subframe, it is common for the same kind of frequency allocation to be applied to the UE data and the data demodulation non-associated control information. In particular, if localized allocation is applied to the UE data, it should be applied to the data demodulation non-associated control information as well.

As previously described, the ACK/NACK may be represented by a relatively few number of bits. The UE, for example, may repeatedly transmit ACK/NACK for error rate enhancement. This may be accomplished using, for example, the various techniques previously described with regard to FIGS. 3A and 3B.

Note that the repeated ACK/NACK can be transmitted via a resource unit that is a bundle of a prescribed number of consecutive subcarriers. The resource unit generally includes 25 long block frequency intervals, which does not appear to be a significant limitation. Alternatively, the resource unit may include long block frequency intervals of other lengths (e.g., 15, 12, 10, and the like). The size of a normal resource unit can be represented as:

$$RU = 25*15\ KHz(LB) = 375\ KHz.$$

Hence, the localized allocation among the above-described frequency allocation techniques is characterized in that N resource units are consecutively allocated to a partial band.

The distributed allocation among the described frequency allocation methods is characterized in that N resource units are discontinuously and equally allocated across entire bands.

Figure 16:
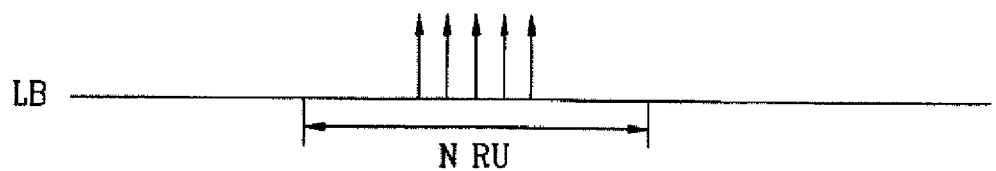
FIG. 16 provides an example of closely arranged subcarriers.

In localized allocation, a frequency resource allocated to subcarriers for ACK/NACK signal transmission is smaller than a frequency resource occupied by N resource units. As an example, FIG. 16 shows a distribution of subcarriers used for resource unit and ACK/NACK transmission. In particular, N resource units are consecutively allocated to a partial band of an uplink frequency resource. The subcarriers used for repeated transmission of ACK/NACK signal among subcarriers included in the N resource units can be intensively arranged on a specific band (central band in FIG. 16) of the frequency resource occupied by the N resource units. This case is referred to as pure localized allocation.

As noted above, localized allocation is vulnerable to channel influence since data is transmitted on an adjacent channel. Pure localized allocation is more vulnerable to channel influence since the subcarriers of the transmission object included in the N resource units are intensively located on a specific band, as well as the N resource units being adjacent to each other.

Figure 17:
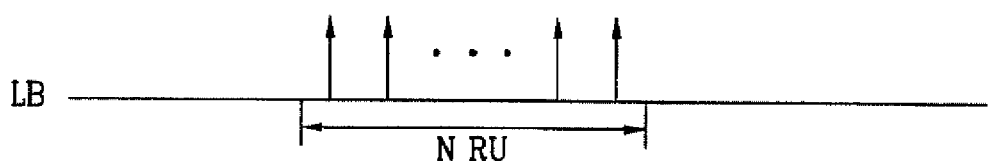
FIG. 17 provides an example of a subcarrier arrangement using enhanced localized allocation.

To improve these vulnerabilities, enhanced localized allocation (distributed within allocated frequency resources) may be utilized. FIG. 17 provides an example of a subcarrier arrangement using enhanced localized allocation. This technique applies distributed allocation to the subcarriers of the transmission object included in the N resource units, while applying localized allocation to the N resource units. In particular, subcarriers actually used for transmission of ACK/NACK signal are equally spaced and discontinuously arranged across the entire frequency resource.

Figure 18:
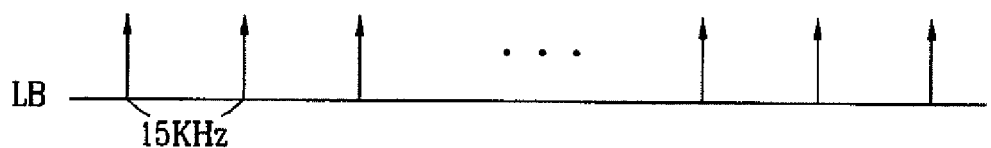
FIG. 18 shows a distribution of subcarriers used for ACK/NACK signal transmission.

FIG. 18 shows a distribution of subcarriers used for ACK/NACK signal transmission. The distributed allocation may be used to achieve frequency diversity. When a pilot is carried by a short block, a pilot interval becomes wider than when a long block is used. Such an arrangement may not be preferable since channel estimation performance may be degraded. An enhanced distributed allocation capable of enhancing channel estimation performance may be achieved by grouping subcarriers for ACK/NACK signal transmission into a plurality of groups, each of which includes at least two subcarriers. These groups are then arranged instead of arranging the individual subcarriers.

Figure 19A:
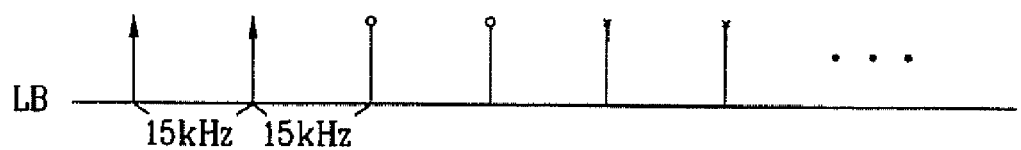
FIGS. 19A and 19B depict a subcarrier arrangement using enhanced distributed allocation, in which a pair of subcarriers is configured as a group.
Figure 19B:

FIGS. 19A and 19B depict a subcarrier arrangement using enhanced distributed allocation, in which a pair of subcarriers is configured as a group. In FIG. 19A, since each subcarrier carries an ACK/NACK signal using a long block, a frequency interval (e.g., 15 KHz) amounting to the long block exists between a pair of the subcarriers configuring the corresponding group.

In order to transmit an ACK/NACK signal to a receiving terminal, pilot information for matching synchronization between transmitting and receiving terminals should be transmitted to the receiving terminal. Since it is unnecessary to transmit the pilot information for each subcarrier, the present embodiment implements one pilot that is transmitted for a pair of the grouped subcarriers. The pilot information is carried by a short block. Since a frequency band (e.g., 30 KHz) of a short block is generally twice as wide as that of a long block, it coincides with the technique that one pilot is transmitted for each pair of the subcarriers for ACK/NACK signal transmission.

Figure 20A:
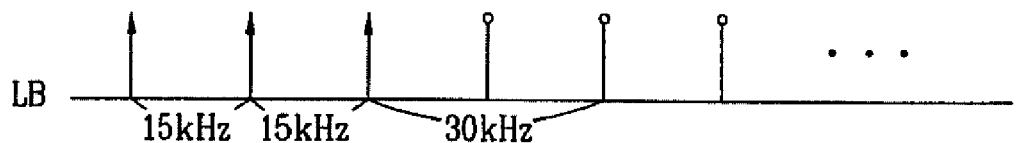
FIGS. 20A and 20B depict further subcarrier arrangements.
Figure 20B:
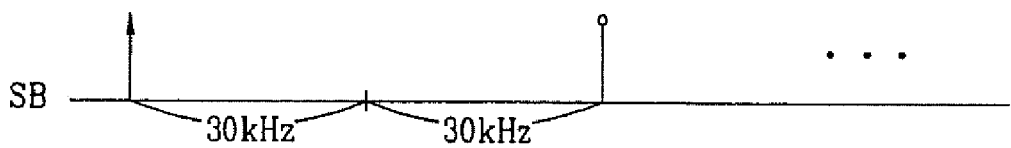

FIG. 19B shows frequency resource allocation of subcarriers for the pilot information transmission. Consider a grouping of subcarriers for ACK/NACK signal transmission by a three-subcarrier unit, a frequency band (15 KHz*3=45 KHz) occupied by one group is not equal to a frequency band (30 KHz) occupied by the subcarriers for pilot transmission. Because of this, a gap of 30 KHz between the groups may be necessary (FIG. 20A). Since the subcarriers for pilot information transmission, as shown in FIG. 20B, should be arranged for each 60 KHz, channel estimation performance using a pilot is degraded rather than the case of configuring a group with a pair of subcarriers.

As mentioned in the foregoing description, the enhanced localized allocation or the enhanced distributed allocation is typically carried out by a suitable subcarrier mapper (e.g., block 220 of FIG. 14) of the OFDM transmitting terminal or the subcarrier mapper of the OFDMA transmitting terminal (e.g., block 330 of FIG. 15). Alternatively, the enhanced localized allocation or the enhanced distributed allocation can be carried out by a subcarrier arranging module responsible for each frequency resource allocation.

A benefit of localized allocation permits efficient use of frequency resources and arranges subcarriers for transmission data within the locally allocated resource units. Hence, such an arrangement is protected against channel influence in a manner that is greater than existing systems. Another benefit relates to the distributed allocation to avoid channel influence. This embodiment binds a predetermined number of subcarriers for transmission, and arranges the subcarriers distributively. Hence, compared to conventional systems, degradation of channel estimation is reduced.

Although embodiments of the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for transmitting uplink acknowledgments in response to downlink transmissions, the method comprising:
   receiving, in a User Equipment (UE), a plurality of data blocks from a Node B, wherein each of the data blocks include an associated cyclic redundancy check (CRC);
   determining received status for each of the data blocks by checking the CRC of each of the data blocks;
   generating a response sequence which indicates the received status of all of the received plurality of data blocks;
   modulating the response sequence using QPSK modulation; and
   transmitting, from the UE, the modulated response sequence to the Node B,
   wherein the data blocks comprise a first transport block and a second transport block,
   wherein the received status is either an acknowledgment (ACK) which identifies a data block which has been received without error, or a negative acknowledgment (NACK) which identifies a data block which has been received with an error.

2. The method according to claim 1, wherein the downlink transmissions comprise multiple input multiple output (MIMO) transmissions.

3. The method according to claim 2, further comprising: receiving the data blocks in parallel.

4. The method according to claim 1, wherein the downlink transmissions comprise time division duplex (TDD) transmissions.

5. The method according to claim 4, further comprising: sequentially receiving the data blocks.

6. The method according to claim 4, further comprising: receiving the data blocks in parallel.

7. A portable device for transmitting uplink acknowledgments in response to downlink transmissions, the portable device comprising:
   a receiver configured to receive a plurality of data blocks from a Node B, wherein each of the data blocks include an associated cyclic redundancy check (CRC);
   a processor configured to determine received status for each of the data blocks by checking the CRC of each of the data blocks, to generate a response sequence which indicates the received status of all of the received plurality of data blocks, to modulate the response sequence using QPSK modulation; and
   a transmitter for transmitting the modulated response sequence to the Node B,
   wherein the data blocks comprise a first transport block and a second transport block,
   wherein the received status is either an acknowledgment (ACK) which identifies a data block which has been received without error, or a negative acknowledgment (NACK) which identifies a data block which has been received with an error.

8. The portable device according to claim 7, wherein the downlink transmissions comprise multiple input multiple output (MIMO) transmissions.

9. The portable device according to claim 8, wherein the receiver is further configured to:
   receive the data blocks in parallel.

10. The portable device according to claim 7, wherein the downlink transmissions comprise time division duplex (TDD) transmissions.

11. The portable device according to claim 10, wherein the receiver is further configured to:
    sequentially receive the data blocks.

12. The portable device according to claim 10, wherein the receiver is further configured to:
    receive the data blocks in parallel.

* * * * *